United States Patent [19]

Minami

[11] Patent Number: 5,526,860

[45] Date of Patent: Jun. 18, 1996

[54] PNEUMATIC TIRE

[75] Inventor: Nobuaki Minami, Kobe, Japan

[73] Assignee: Sumitomo Rubber Industries, Ltd., Hyogo-ken, Japan

[21] Appl. No.: 292,188

[22] Filed: Aug. 18, 1994

[30] Foreign Application Priority Data

Aug. 27, 1993 [JP] Japan ................................ 5-235781
Aug. 27, 1993 [JP] Japan ................................ 5-235782

[51] Int. Cl.$^6$ ...................... B60C 101/00; B60C 103/04; B60C 107/00
[52] U.S. Cl. .................. 152/209 R; 152/209 D
[58] Field of Search ................. 152/209 R, 209 A, 152/209 D; D12/146, 147, 148

[56] References Cited

U.S. PATENT DOCUMENTS

| D. 261,497 | 10/1981 | Baus et al. | D12/145 |
|---|---|---|---|
| 4,424,843 | 1/1984 | Fontaine et al. | 152/209 R |
| 4,424,844 | 1/1984 | Fontaine | 152/209 R |
| 4,796,683 | 1/1989 | Kawabata et al. | 152/209 D |

FOREIGN PATENT DOCUMENTS

| 493063 | 7/1992 | European Pat. Off. . | |
| 627332 | 12/1994 | European Pat. Off. . | |
| 3424796 | 1/1985 | Germany . | |
| 85109 | 3/1992 | Japan | 152/209 R |
| 317805 | 11/1992 | Japan | 152/209 R |
| 2250487 | 6/1992 | United Kingdom | 152/209 D |

OTHER PUBLICATIONS

Patent Abstracts of Japan, vol. 15, No. 350, Sep. 5, 1991.
Patent Abstracts of Japan, vol. 17, No. 139, Mar. 22, 1993.

Primary Examiner—Steven D. Maki
Attorney, Agent, or Firm—Birch, Stewart, Kolasch & Birch

[57] ABSTRACT

A pneumatic tire has a block pattern which is divided by a center main groove extending straight on the tire equator, two outer main grooves extending straight outside the center main groove, inner lateral grooves crossing between the center and outer main grooves, and outer lateral grooves crossing between the outer main grooves and tread edges so as to make two inner block rows and two outer block rows. The outer lateral grooves cross the outer main grooves, and the inner lateral grooves cross the center main groove at an inclination opposite to an inclination direction of the outer lateral grooves.

5 Claims, 4 Drawing Sheets

PNEUMATIC TIRE

BACKGROUND OF THE INVENTION

The present invention relates to a pneumatic tire capable of reducing the pass-by noise while maintaining the steering stability, wet grip performance and other running performances.

1. Field of the Invention

As the vehicle speed is getting faster along with the advancement of automotive technology in recent years, the vehicle running noise is increasing, and its control is demanded.

In the tread of the tire, a block pattern is formed by a plurality of circumferential grooves (a), (b) extending continuously in the tire circumferential direction and multiple lateral grooves (d), (e) crossing these circumferential grooves, and therefore, when running in rain, the water between the tread surface and the road surface is discharged through these grooves, and the wet grip performance is enhanced.

When such lateral grooves are provided in a multiplicity, the air compressed between the tread surface and road surface passes through the grooves suddenly, and it occurs intermittently, which causes noise called pumping noise. Such noise is often noted in the tire of block pattern comprising multiple lateral grooves.

To suppress such noise, it has been attempted to lower the speed of the air passing the lateral grooves by
1. decreasing the sectional area of the lateral grooves, or
2. bending the lateral grooves.

By these measures, although the noise is slightly reduced, the measure 1 causes to lower the grip performance, especially wet grip performance, and the measure 2 causes uneven wear on the wall of the lateral grooves, thereby lowering the traveling performances and durability of the tire.

The present inventor has reached the invention by discovering that:
(1) The noise frequency is dispersed and the noise is lessened by differing the pitch of blocks between the block rows.
(2) The wet performance is enhanced by increasing the sectional area of the main grooves extending in the circumferential direction.
(3) The turning performance is enhanced by setting the block pitch in the inner block rows larger than the outer block pitch so as to shape the outer block oblong while strengthening the grip force and brake performance.
(4) The water discharging performance is enhanced and noise generation is further suppressed by smoothly continuing between the lateral grooves in the inner block rows and lateral grooves in the outer block rows.

SUMMARY OF THE INVENTION

It is hence a primary object of the invention to present a pneumatic tire capable of reducing the pass-by noise while maintaining the running performances.

According to one aspect of the present invention, a pneumatic tire comprises a tread with a block pattern which has a center main groove extending on the tire equator, two outer main grooves disposed outside the center main groove in the tire axial direction, inner lateral grooves crossing between the center main groove and the outer main grooves and outer lateral grooves crossing between the outer main grooves and tread edges, so that a tread surface is divided into two inner block rows of inner blocks divided by the center main groove, one of the outer main grooves and inner lateral grooves and two outer block rows of outer blocks divided by one of the outer main grooves, one of the tread edges and the outer lateral grooves. The center and outer main grooves have parallel groove edges on the tread surface extending substantially straight in the tire circumferential direction. Each of the outer lateral grooves crosses the groove edge of the outer main grooves at an inclination. Each of the inner lateral grooves crosses the groove edge of the center main groove at an inclination opposite to an inclination direction of the outer lateral grooves. And the tire is satisfied with the following relation;

$$0.3 \leq Ni/No \leq 0.7$$

$$0.1W \leq WG1 \leq 0.17W$$

$$0.1W \leq WG2 \leq 0.17W$$

$$0.3W \leq WBi \leq 0.6W$$

$$0.3W \leq WBo \leq 0.6W$$

$$1.3 \leq Pgi/WBi \leq 3.5$$

$$0.5 \leq Pgo/WBo \leq 1.2$$

where:
$Ni$ being the number of inner blocks in one inner block row:

$No$ being the number of outer blocks in one outer block row:

$WG1$ being the center groove width corresponding to the length between the groove edges of the center groove in the tire axial direction:

$WG2$ being the outer groove width corresponding to the length between the groove edges of the outer groove in the tire axial direction:

$WBi$ being the inner block width corresponding to the length between the groove edges of the center main groove and the outer main groove in the tire axial direction:

$WBo$ being the ground contacting width of the outer blocks corresponding to the length between the ground contacting edge and the groove edge of the outer main groove in the tire axial direction:

$Pgi$ being the pitch length of the inner lateral grooves in the circumferential direction:

$Pgo$ being the pitch length of the outer lateral grooves in the circumferential direction: and $W$ being a ground contacting half width from the tire equator to the one ground contacting edge:

The ratio $Ni/No$ of the number $Ni$ of the inner blocks and the number $No$ of the outer blocks are from 0.3 to 0.7. Therefore, when running, a deviation occurs in the noise frequency between the pumping noise generated from the inner block rows and the pumping noise generated from the outer block rows. By this deviation, the range of the noise is diffused, and the irritating noise to the ear having the peak at 1000 Hz characteristic of the pumping noise is diffused, so that it may be lessened and alleviated. Still more, by defining the ratio $Ni/No$ within the above mentioned range, the peak frequency of the noise generated from both inner and outer blocks can be separated, and generation of resonant sound like beat is eliminated.

If less than 0.3, the length of the outer blocks in the circumferential direction become too long, thereby impairing the grip performance in dry and wet condition. But if exceeding 0.7, the noise generated from the outer block rows and the inner block rows are resonant to each other, and the effect to reduce the pass-by noise is not achieved.

The center and outer main grooves have their groove widths WG1, WG2 in a range of 0.1 to 0.17 times the ground contacting half width W, and hence these main grooves keep the water discharging performance. If less than 0.1 times, the water discharge performance is low in running in rain, and the wet grip performance, wet braking and other wet running performances are impaired. But if exceeding 0.17 times, the actual ground contact area becomes smaller, and the ground contact pressure elevates, and the wear of the tread surface is accelerated, and the durability is lowered.

Further, the inner block width WBi and the ground contacting width WBo of the outer blocks are defined in a range of 0.3 to 0.6 times the width W. This is intended to equalize the ground contacting area of the inner and outer blocks, and by equalizing the ground contacting areas of the both block rows as close as possible, the sound levels of the noise generated in both block rows come closer to each other, so that the sound can be smoothed. If either block is less than 0.3 times or exceeds 0.6 times, the balance of the noise levels produced from the both block rows is broken, and the effect for lowering the noise and the effect for smoothing the noise are become smaller.

Furthermore, the ratio Pgi/WBi of the pitch length Pgi of the inner lateral grooves to the inner block width WBi is defined in a range of 1.3 to 3.5. Therefore, the inner blocks are formed as slender blocks having the length in the circumferential direction longer than the width dimension are formed. It causes to enhance the traction force. If the ratio Pgi/WBi is less than 1.3, the traction performance is lowered. If exceeding 3.5, to the contrary, the interval of inner lateral grooves is too long and the water discharge performance is lowered, thereby impairing the wet grip performance and wet braking performance.

In addition, the ratio Pgo/WBo of the pitch length Pgo of the outer lateral grooves to the ground contacting width WBo of the outer blocks is defined in a range of 0.5 to 1.2. Therefore, the ground contacting surface of the outer blocks is an oblong shape having the length in the circumferential direction shorter than the width, or a square, or a slender shape similar to a square. By defining the ground contacting surface of the outer blocks at the specified ratio, the cornering performance such as the running stability and steering stability in turning can be enhanced. If the ratio Pgo/WBo is less than 0.5, the traction performance in straight running is impaired, and if exceeding 1.2, the cornering performance is inferior.

In the invention, the Individual constitutions as mentioned above are coupled and united organically, and the pass-by noise is reduced while maintaining the running performances in dry and wet state.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
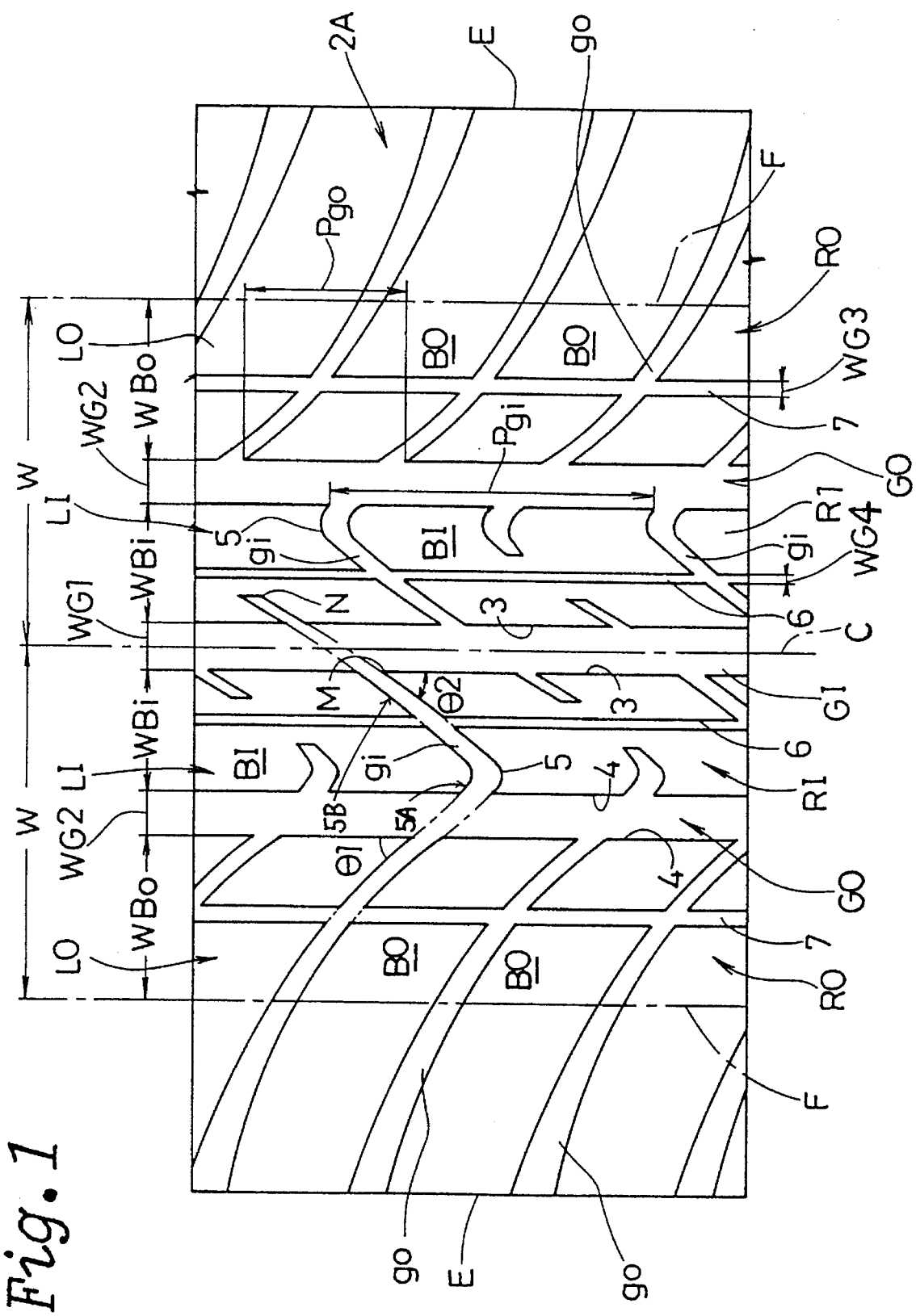
FIG. 1 is a developed plan view showing a tread pattern of an embodiment of the invention.

A pneumatic tire 1 comprises a tread 2 with a block pattern, two side walls 18 each extending inwardly in the tire's radial direction from both ends of the tread 2 and two beads 14 one located at the inward end of each sidewall 13. The pneumatic tire 1 is, also, reinforced by a toroidal carcass 16 extending from the tread 2 through the side walls 13 and turned up around the bead core 15 of the bead 14, a belt layer 17 disposed radially outside the carcass 16, and a bead apex rubber 18 extending radially outwardly from the bead core 15 between the carcass main body and carcass turned up portion.

The carcass 16 is composed of one carcass ply in this embodiment. The carcass ply has the carcass cords arranged at an angle of 80 to 90 degrees to the tire equator C and covered with topping rubber. Nylon, polyester, rayon, aromatic polyamide, or other organic fiber cords are used as carcass cords.

The belt layer 17 is composed of two belt plies i? A in this embodiment. The belt plies 17A have belt cords such as nylon, polyester, rayon, aromatic polyamide, or other organic fiber cords or steel cords, which are arranged in mutually intersecting directions between plies.

On the other hand, the tread 2 has a center main groove GI extending on the tire equator C and two outer main grooves GO disposed both sides of the center main groove GI so as to divide the tread surface 2A into a pair of inner ribs RI, RI between the center main groove GI and the outer main grooves GO, and a pair of outer ribs RO, RO between the tread edges E and the outer main grooves GO. The center main groove GI has groove edges 3, at which the opposing groove walls intersect with the tread surface 2A, extending substantially straight in the tire circumferential direction. Each of the outer main groove GO, also, has groove edges 4, at which the opposing groove walls intersect with the tread surface 2A, extending substantially straight in the tire circumferential direction.

Further, the inner ribs RI are provided with inner lateral grooves gi crossing the adjoining groove edges 3, 4 of the center and outer main grooves GI, GO so as to form inner block rows LI of inner blocks BI arranging in the circumferential direction. The outer ribs RO are provided with outer lateral grooves go crossing the adjoining tread edges E and groove edges 4 of the outer main grooves GO so as to form outer block rows LO of outer blocks BO arranging in the circumference direction.

In the pneumatic tire 1, a ground contacting surface of tread 2 where the tread surface 2A contacts the road surface in the normal state of tire is defined as the ground contacting region. And the distance between the ground contacting edge F, which is the edge remotest from the tire equator C among the periphery of the ground contacting region in the tire axial direction, and the tire equator C is defined as the ground contacting half width W. The above mentioned normal state of tire is a state that a tire is mounted on a regular rim officially approved for the tire by, for example JATMA, TRA, ETRTO and the like, and inflated with a regular internal pressure officially specified as the maximum air pressure in Air-pressure/Mas.-loads Table by, for example JATMA, TRA, ETRTO and the like, and loaded with a normal tire load officially specified as the maximum load for the tire in Air-pressure/Max.-loads Table by, for example JATMA, TRA, ETRTO and the like, In such the block pattern, the center groove width WG1 between the opposing groove edges 3, 3 of the center main groove GI in the tire axial direction is defined in a range of 0.1 to 0.17 times the ground contacting half width W, and the outer groove width WG2 between the opposing groove edges 4, 4 of the outer main grooves GO in the tire axial direction is set in a range of 0.1 to 0.17 times the ground contacting half width W, same as in the case of the center main groove GI. However, it is not necessarily required to equalize the width dimensions of WG1 and WG2. Incidentally, the groove depth of the center and outer main grooves GI, GO is preferred to be in a range of 0.12 to 0.2 times the ground contacting half width W.

The outer lateral grooves go extend from the tread edge axially inwardly along a mildly curved line, in this embodiment, and intersect the groove edge 4 of the outer main grooves GO at an inclination. The inclination angle $\theta 1$ at the acute angle side intersecting the groove edge 4 is set in a range of 30 to 90 degrees.

The outer lateral grooves go provide in each outer rib RO are spaced at nearly equal pitch in the circumferential direction, and extend parallel to each other in the same direction and at the same inclination angle $\theta 1$. In this embodiment, the outer lateral grooves go provide in one outer rib RO and the outer lateral grooves go provide in other outer rib RO are a point symmetrical arrangement to each other, therefore the outer lateral grooves go of one outer rib RO and the outer lateral grooves go of the other outer rib RO are inclined in a same direction.

The inner lateral grooves gi are smoothly consecutive to lateral groove go of the adjacent outer block row LO through the outer main grooves GO. And the inner lateral grooves gi have a bending point 5, at which the inner lateral groove gi inverts the inclination direction to the tire circumferential direction, in the inner rib RI. That is, the inner lateral groove gi is composed of a portion 5A, which is disposed axially outside the bending point 5 and smoothly consecutive to the adjacent lateral groove go, and a portion 5B, which is disposed axially inside the bending point 5 and inclined in an opposite direction to the portion 5A.

The inner lateral grooves gi intersect the groove edge 3 of the center main groove GI at the point M at an inclination, and the inclination angle $\theta 2$ at the acute angle side is defined in a range of 15 to 70 degrees.

Such inner lateral grooves gi are provided at every other outer lateral groove go, and disposed nearly at same pitch in the circumferential direction in the same direction, and at a same inclination angle $\theta 2$ to the center main groove The inner lateral grooves gi pass through, in this embodiment, the center main groove GI, and are terminated at the point N in the inner blocks BI of the adjacent inner block row LI.

By varying the direction of the inner lateral grooves at the bending point 5, the flow of the air passing the inner lateral grooves gi is lowered at the bending point 5, and hence the pass-by noise generated by the lateral grooves gi may be suppressed. On the other hand, the inner lateral grooves gi are smoothly consecutive to the outer transverse grooves go, and hence the water flowing in the inner lateral grooves gi can flow into the outer lateral grooves go, so that it may be discharged efficiently from the outer lateral grooves go.

Moreover, since the angle $\theta 2$ is 15 to 70 degrees, when the direction of the portion 5B is set to the tire rotating direction, the water in the inner ribs RI being highest in the grounding pressure may be passed efficiently. Therefore, hydroplaning on wet road can be prevented, and the running stability and braking performance on wet road can be enhanced. If the angle $\theta 2$ is less than 15 degrees, the angle of the inner blocks BI formed by the central main groove GI and the inner lateral grooves gi is acute, and uneven wear is likely to occur in the acute part. When the angle $\theta 2$ is over 70 degrees, the capacity of collecting the water of the inner lateral grooves gi is lowered, and the water discharge performance is inferior.

Furthermore, since the angle $\theta 1$ of the outer lateral grooves go is defined within 30 to 90 degrees, the water flowing in from the outer lateral grooves go and inner lateral grooves gi is efficiently discharged toward the both sides in the tire axial direction, so that the wet performance is enhanced. If the angle $\theta 1$ is less than 30 degrees or more than 90 degrees, the water discharge performance by the outer lateral grooves go is lowered, and the wet performance drops.

The groove depth of such inner and outer lateral grooves gi, go is desired to be 0.7 to 1.0 times the groove depth of the center and outer main grooves GI, GO.

Further, in the block pattern, the width WBi of the inner block BI, that is, the length in the tire axial direction between the groove edge 3 and 4 adjacent to each other is set in a range of 0.3 to 0.6 times the ground contacting half width W, and the ground contacting width WBO of the outer block BO, that is, the length in the tire axial direction between the groove edge 4 and the ground contacting edge F adjacent to each other is set in a range of 0.3 to 0.6 times the ground contacting half width W.

In the inner ribs RI, the ratio Pgi/WBi of the pitch length Pgi of the inner lateral groove gi in the circumferential direction to the inner block width WBi is set in a range of 1.3 to 3.5, thereby shaping the inner block BI long in the circumferential direction.

In the outer ribs RO, the ratio Pgo/WBo of the pitch length Pgo of the outer lateral groove go in the circumferential direction to the ground contacting width WBo of the outer block BO is set in a range of 0.5 to 1.2, thereby shaping the ground surface of the outer block BO as an oblong shape or a slender shape close to square in the circumferential direction.

The ratio Ni/No of the number No of outer blocks BO in one outer block row LO to the number Ni of BI in one inner block row LI is 0.5, In this embodiment, because the inner lateral grooves gi are provided at every other outer lateral groove go. However, the ratio Ni/No is permitted to be 0.3 to 0.7. By setting the ratio Ni/No within the above mentioned range, a deviation of the noise frequency occurs between the pumping noise generated from the inner block rows and the pumping noise generated from the outer block rows so as to diffusing the range of the noise. Also the peak frequency of the noise, generated from both inner and outer blocks can be separated, and generation of resonant sound like beat is eliminated.

In this embodiment, the inner block BI and outer block BO are provided with fine grooves 6, 7 respectively, each extending linearly in the tire circumferential direction. The groove widths WG3, WG4 of these fine grooves 6, 7 are preferred to be in a range of 0.01 to 0.07 times the ground contacting half width W. Such fine grooves 6, 7 improve further the water discharging performance of the tread surface, thereby enhancing the wet running performance. And also in dry running, the gripping force of the blocks BI, BO is stronger, and the traction performance and braking performance can be enhanced.

When the groove width WG3, WG4 are less than 0.01 times the ground contacting half width W, effect on the water discharge performance is not recognized, and if exceeding 0.07 times, the ground contacting area of the blocks BI, BO is smaller, and the wear resistance deteriorates.

Figure 3:
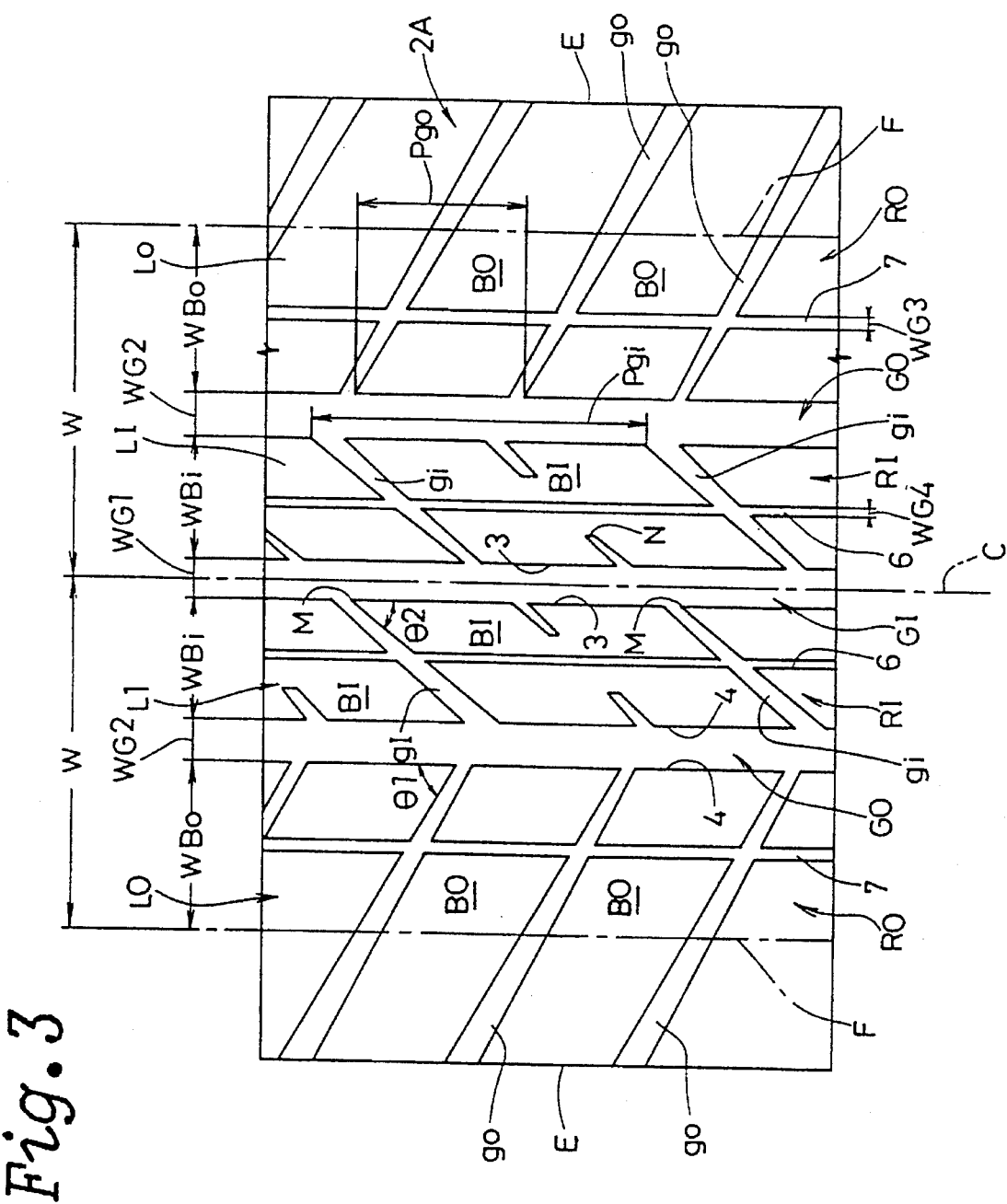
FIG. 3 is a developed plan view showing a tread pattern of other embodiment of the invention.

The FIG. 3 shows a block pattern of other embodiment of the invention. In FIG. 3, the inner lateral grooves gi extend substantially straight without the bending point 5, and are smoothly consecutive to every other adjacent outer lateral groove go. The outer lateral grooves go of one outer rib RO are inclined at a same angle and in a same direction with the outer lateral grooves go of other outer rib RO.

[EXAMPLES]

Figure 2:
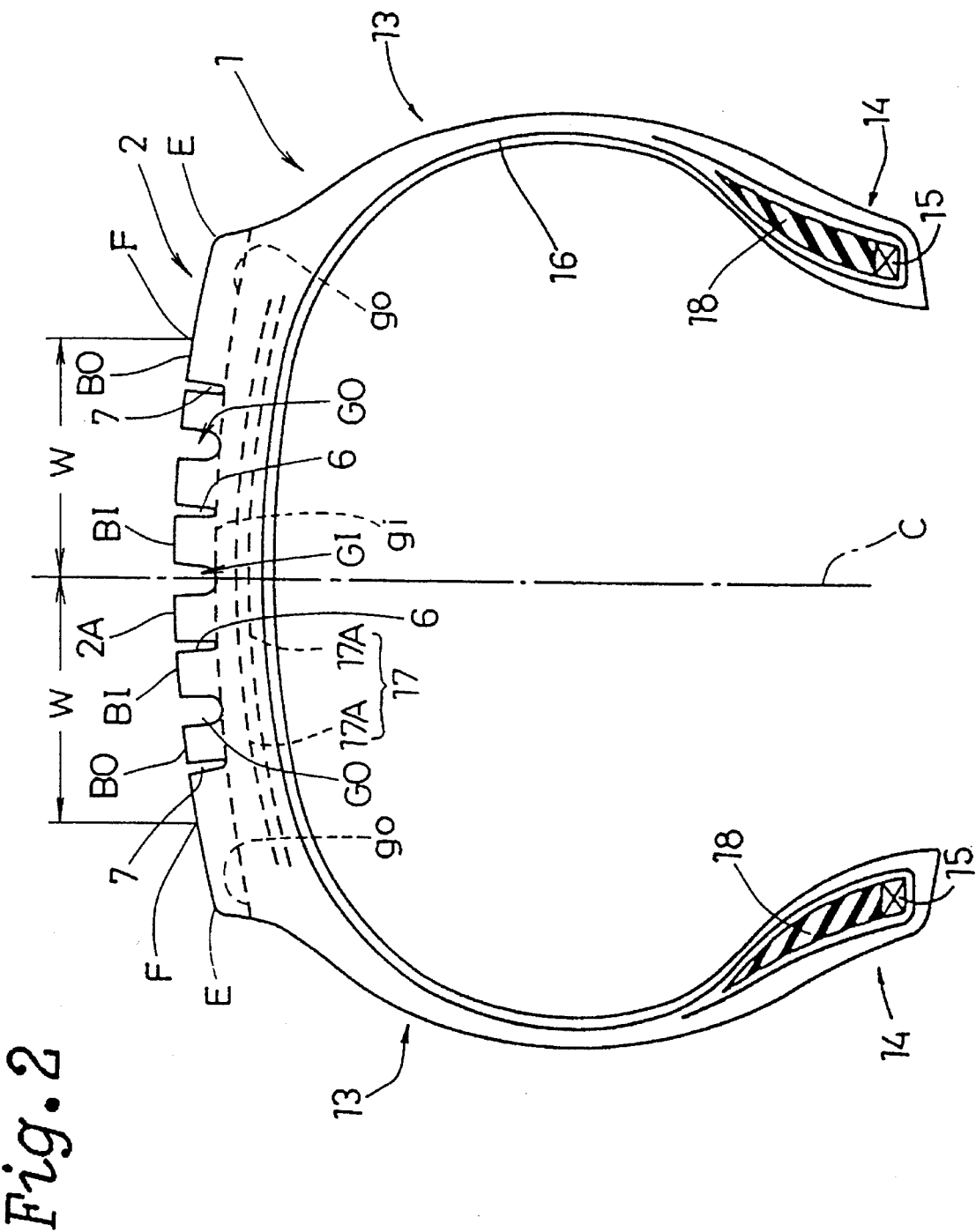
FIG. 2 is a sectional view of a tire suitably used in the invention.
Figure 4:
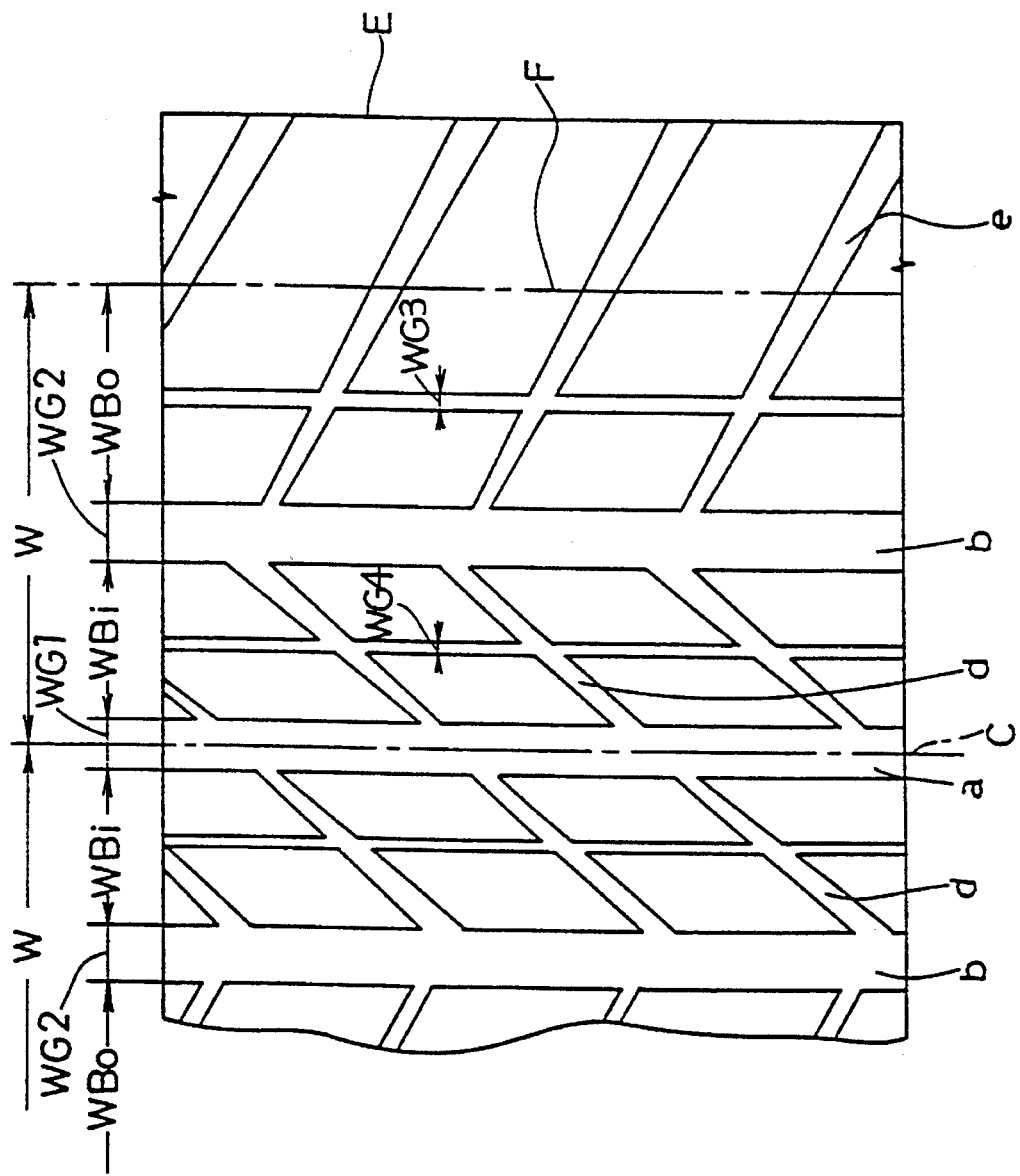
FIG. 4 is a developed plan view showing a tread pattern of a conventional tire.

Trial products of tires (embodiments) in the tire size of 195/60, the composition as shown in FIGS. 1, 2, and specification as shown in Table 1 were fabricated, and their performances were tested. Tires of conventional patterns (comparative examples) shown in FIG. 4 were also tested, and the performances were compared.

The test methods were as follows.

1) Pass-by noise

An actual car coasting test specified in JASO C606 was conducted, and a four-wheel drive of 1500 class mounting the test tires was tested in a straight test course, and a distance of 50 m was driven at a passing speed of 60 km/h, and at the center point of the course, a microphone was set up at a distance of 7.5 m from the running center line at a height of 1.2 m from the road surface, and the pass-by noise was measured, and expressed in an index with the prior art taken as 100. The greater the figure, the smaller the pass-by noise.

2) Brake performance

Using the same car as in 1), the test road was driven at a speed of 60 km/h, and the vehicle was suddenly braked by locking four wheels, and the stopping distance was measured, and indicated as the index with the prior art taken as 100. The greater figure means the better performance.

3) Turning performance

Using the same car as in 1), a curved road with radius of 50 m was turned, and the turning performance was evaluated by the required time and the driver's feeling, and indicated as the index with the prior art taken as 100. The greater figure means the better performance.

4) Wet performance

Using the same car as in 1), the speed was accelerated from 0 gradually on a skid pad road with a water height of 5 mm, and the speed when slipping began to take place was expressed as the index with comparative example 1 taken as 100. The greater figure means the better performance.

5) Steering stability

Driving the test course by using the same car as in 1), it was judged by the driver's feeling, and indicated as the index with the prior art taken as 100. The greater figure means the better result.

The test results are shown in Table 1.

As a result of tests, the embodiments were proved to be lowered in pass-by noise and enhanced in the running performances as compared with the prior art.

TABLE 1

| | Embodiment | Comparative |
|---|---|---|
| The center groove width (WG1) | 9.0 mm | 9.0 mm |
| The outer groove width (WG2) | 10.5 mm | 10.5 mm |
| The fine groove width of inner block (WG3) | 1.2 mm | 1.2 mm |
| The fine groove width of outer block (WG4) | 2.7 mm | 2.7 mm |
| The ground contacting half width (W) | 72.0 mm | 72.0 mm |
| Ratio WG1/W | 0.125 | 0.125 |
| Ratio WG2/W | 0.153 | 0.153 |
| Ratio WG3/W | 0.017 | 0.017 |
| Ratio WG4/W | 0.038 | 0.038 |
| The inner block width (WBi) | 25.0 mm | 25.0 mm |
| The grounding width of outer block (WBo) | 43.0 mm | 43.0 mm |
| Number of inner blocks in one block row (Ni) | 33 | 66 |
| Number of outer blocks in one block row (No) | 66 | 66 |
| Ratio Ni/No | 0.5 | 1 |
| Angle (θ 1) | 50 deg. ±5° | — |
| Angle (θ 2) | 35 deg. ±5° | — |
| Pass-by noise (index) | 120 | 100 |
| Brake performance (index) | 115 | 100 |
| Turning performance (index) | 115 | 100 |
| Wet performance (index) | 115 | 100 |
| Steering stability (index) | 120 | 100 |

What is claimed is:

1. A pneumatic tire comprising a tread;

said tread having a center main groove extending on the tire equator, two outer main grooves disposed outside the center main groove in the tire axial direction, inner lateral grooves crossing between the center main groove and the outer main grooves, and outer lateral grooves crossing between the outer main grooves and tread edges so as to divide a tread surface into two inner block rows of inner blocks, wherein said inner blocks are defined by the center main groove, the outer main grooves and the inner lateral grooves, and two outer block rows of outer blocks, wherein said outer blocks are defined by the outer main grooves, the tread edges and the outer lateral grooves;

said center and outer main grooves having parallel groove edges on the tread surface extending substantially straight in the tire circumferential direction;

each of said outer lateral grooves crossing the groove edge of the outer main grooves at an inclination;

each of said inner lateral grooves crossing the groove edge of the center main groove at an inclination opposite to an inclination direction of the outer lateral grooves; and said tread having the following relationships:

$0.3 \leq Ni/No \leq 0.7$ $0.1W \leq WG1 \leq 0.17W$ $0.1W \leq WG2 \leq 0.17W$ $0.3W \leq WBi \leq 0.6W$ $0.3W \leq WBo \leq 0.6W$ $1.3 \leq Pgi/WBi \leq 3.5$ $0.5 \leq Pgo/Wbo \leq 1.2$ where:

Ni is the number of inner blocks in one inner block row;

No is the number of outer blocks in one outer block row;

WG1 is the center groove width wherein the center groove width is the length between the groove edges of the center groove in the tire axial direction;

WG2 is the outer groove width, wherein the outer groove width is the length between the groove edges of the outer groove in the tire axial direction;

WBi is the inner block width, wherein the inner block width is the length between the groove edges of the center main groove and the outer main groove in the tire axial direction;

WBo is the ground contacting width of the outer blocks, wherein the ground contacting width of the outer blocks is the length between a ground contacting edge and the groove edge of the outer main groove in the tire axial direction;

Pgi is the pitch length of the inner lateral grooves in the circumferential direction;

Pgo is the pitch length of the outer lateral grooves in the circumferential direction; and W is a ground contacting half width extending from the tire equator to a ground contacting edge, wherein the inner lateral grooves are smoothly consecutive to every other outer lateral groove of an adjacent outer block row and each of the inner lateral grooves have a bending point such that a portion of the inner lateral groove which is disposed axially outside the bending point is inclined in an opposite direction to the portion of the inner lateral groove which is disposed axially inside the bending point.

2. A pneumatic tire of claim 1, wherein the inner lateral grooves pass through the center main grove, and are interrupted in the inner blocks of an adjacent inner block row.

3. A pneumatic tire of claim 1, wherein the inner blocks and outer blocks are provided with a fine groove, of which the groove width being 0.01 to 0.07 times the ground contacting half width W, extending substantially straight in the tire circumferential direction.

4. A pneumatic tire of claim 1, wherein the outer lateral grooves of each outer block row are extended parallel to each other, and the outer lateral grooves of one outer block row are inclined in the same direction with the outer lateral grooves of the other outer block row.

5. A pneumatic tire of claim 1, an angle $\theta 1$ at the acute side of the outer lateral grooves crossing the groove edge of the outer main grooves is in a range of 30 to 90 degrees, and an angle $\theta 2$ at the acute side of the inner lateral grooves crossing the groove edge of the center main groove is in a range of 15 to 70 degrees.

* * * * *